(12) United States Patent
Ounapuu et al.

(10) Patent No.: US 9,327,791 B2
(45) Date of Patent: May 3, 2016

(54) FOLDABLE VEHICLE

(71) Applicant: Stigo OU, Harju maakond (EE)

(72) Inventors: Matti Ounapuu, Tallinn (EE); Rainer Nolvak, Tallinn (EE); Ardo Reinsalu, Tallinn (EE)

(73) Assignee: STIGO OU, Harju Maakond (EE)

( * ) Notice: Subject to any disclaimer, the term of this patent is extended or adjusted under 35 U.S.C. 154(b) by 0 days.

(21) Appl. No.: 14/681,435

(22) Filed: Apr. 8, 2015

(65) Prior Publication Data

US 2015/0291243 A1 Oct. 15, 2015

(30) Foreign Application Priority Data

Apr. 11, 2014 (EP) ..................................... 14164491

(51) Int. Cl.
  *B62K 15/00* (2006.01)
(52) U.S. Cl.
  CPC ......... *B62K 15/006* (2013.01); *B62K 2015/005* (2013.01)
(58) Field of Classification Search
  CPC ................................ B62K 5/006; B62K 5/008
  See application file for complete search history.

(56) References Cited

U.S. PATENT DOCUMENTS

| 7,080,847 | B2 * | 7/2006 | Chao | ........................ | B62K 3/10 280/278 |
| 2005/0230933 | A1 * | 10/2005 | Woo | ...................... | B62K 15/008 280/278 |
| 2007/0158928 | A1 * | 7/2007 | Wu | ....................... | B62K 15/008 280/278 |
| 2008/0185812 | A1 * | 8/2008 | Liu | .......................... | B62H 1/12 280/278 |
| 2015/0232141 | A1 * | 8/2015 | Bettin | ...................... | B62J 1/007 280/259 |

\* cited by examiner

*Primary Examiner* — Kevin Hurley
(74) *Attorney, Agent, or Firm* — Young & Thompson

(57) ABSTRACT

A battery or mechanically powered, foldable, light two-wheel or three-wheel vehicle that is rapidly lockable and unlockable at two points. The vehicle includes an upper frame pipe consisting of two parallel parts, whose front end is connected to an upright element connecting the front wheel fork and the vehicle's handlebar with a certain length of the distal end of the upper frame pipe extending distally from under the saddle; a lower frame pipe consisting of two parallel parts, whose front end is connected to the upright element connecting the front wheel fork with the vehicle's handlebar, with the rear wheel or wheels located at the distal end; a support pipe consisting of two parallel parts between the saddle and the lower frame pipe, and extending below the lower frame pipe so that the lower end of the support pipe is equipped with leg supports. The vehicle has auxiliary transportation wheels.

14 Claims, 6 Drawing Sheets

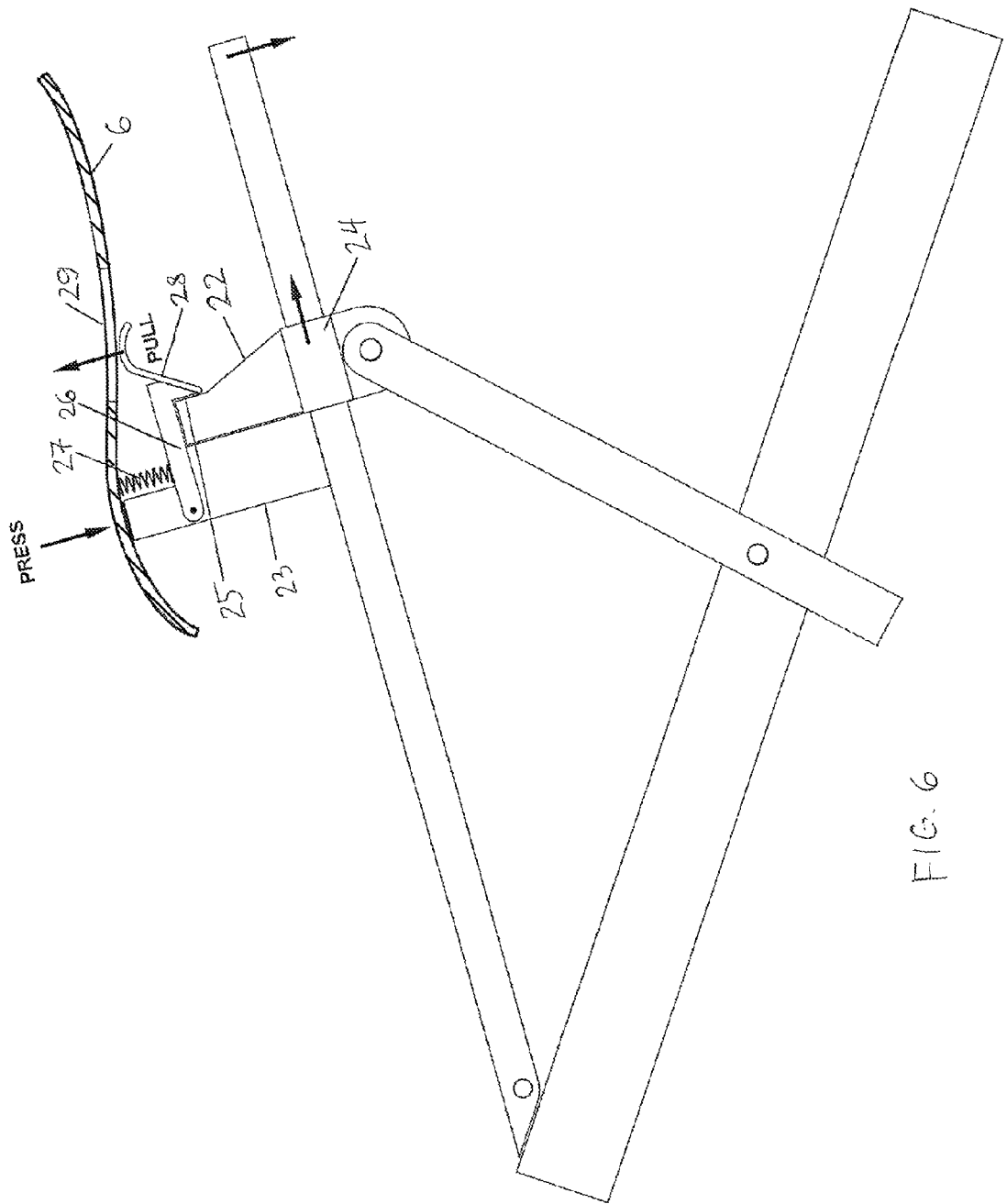

FOLDABLE VEHICLE

FIELD OF THE INVENTION

The invention is related to the field of personal vehicles. The invention is related to a battery or mechanically powered, quickly foldable, light two-wheel or three-wheel individual vehicle.

STATE OF THE ART http://www.strida.com discloses a folding bicycle with a triangular frame.

http://www.carrymefoldingbike.com/ discloses a folding bicycle with training wheels.

The solutions known in the art have some shortcomings.
a) More than two operations are needed to fold the vehicle, or more time is needed to carry out each operation, and
b) certain parts of the frame need to be disengaged to fold the vehicle.

The invention provides a vehicle for comfortably covering short distances. The design of the vehicle allows to fold it easily and fast to save space.

The advantages of the current invention:

The vehicle can be folded/packed up by releasing two locks from locking positions.

The measures and proportions of the vehicle have been calculated so that in a riding position, the legs of an adult person can reach the leg supports, hands can reach the handlebars, and legs can reach the ground when stopped.

The preferred embodiment of the invention can withstand loads up to 110 kg, despite the fact that the frame is made up of thin aluminium pipes. The triangular design of the middle part of the frame gives it strength and rigidity, along with the fact that elements of the frame are composed of two parallel elements.

The vehicle of the invention provides an ergonomic riding position—the person sitting on the saddle is supported by his legs and hands. The invention also provides an ergonomic posture for the legs—thanks to the design of the pedals, they are located in a place where they ensure an ergonomic posture for the legs in the riding position. A sliding carriage on the frame is used to fold one part of the frame of the vehicle. In the riding position, the elements of the frame of the vehicle of the invention constitute a right triangle in middle of the frame where one arm is formed by the lower frame pipe part from the handlebar to leg supports and pedals, another arm is formed by the support element, such as a support pipe, between the saddle and the lower frame element, and the hypotenuse is formed by the upper frame pipe of the frame. Alternatively, the angle between the lower frame pipe and the support element of the frame of the vehicle of the invention can be less than 90° or greater than 90°.

SUMMARY OF THE INVENTION

The goal of the present invention is to provide a vehicle design that overcomes the deficiencies of the solutions known in the art. The ergonomic riding position of the vehicle of the invention is achieved as a solution of the relationship between three points the saddle, leg support and the vehicle's handlebar—whereby the weight of body is evenly distributed between these three supporting points so the load on each of these points is even. This is beneficial both for the rider and the vehicle. The vehicle of the invention includes:

a frame with:
i) an upper frame pipe comprising two parallel parts, the front end of which is connected to the upright element connecting the fork of the front wheel and the vehicle's handlebar, with a certain part of the distal end of the upper frame pipe extending distally from under the saddle;
ii) a lower frame pipe comprising two parallel parts, the front end on which is connected to the upright element connecting the fork of the front wheel and the vehicle's handlebar, with the rear wheel or wheels attached next to distal end of lower frame pipe for the transportation of the vehicle;
iii) a support element between the saddle and the lower frame pipe comprising two parallel parts, with the support element extending to below the lower frame pipe so that the support element's lower can bear the leg supports;
iv) a front wheel fork and handlebar connected to each other by means of an upright element.

The design of the frame is characterized in that:
i) the front end of the upper frame pipe has a swivelling hinge that is equipped with a hinge lock;
ii) the end of the support element between the saddle and the lower frame pipe is pivotally connected to the lower frame pipe, the lower end of the support element extends below the lower frame pipe, forming leg supports, the upper end of the support element is equipped with a sliding carriage fixed to the upper frame pipe in the riding position, while in the folded position of the vehicle, the support element's upper end is shifted longitudinally along the upper frame pipe with the sliding carriage so that in the folded position, the upper and lower frame pipes and support element are essentially parallel;
iii) the upright element connecting the front wheel fork with the vehicle's handlebar can be pivotally fixed in the riding position and/or the transport position so that in the folded position, the first wheel is turned towards the rear wheel and the vehicle's handlebar is turned forward, forming a transportation handle;
iv) the saddle can be fixed either to the support element or alternatively to the upper frame pipe;
v) the lower frame element and support pipe cross each other at an angle a that in a preferred embodiment is 90°, in alternative embodiments the said angle can vary between 80-100°.
vi) the frame of the vehicle has auxiliary wheels for transportation, which are located at the distal part of the upper frame pipe in the preferred embodiment; alternatively, the auxiliary wheels can be located at the free end of the lower frame pipe, behind the rear wheel.

The location of the auxiliary wheel is designed so that the vehicle could be towed in its folded form by a regular size person, and that in the upright position (in which the vehicle takes least amount of space), the auxiliary wheels would serve as a supporting point. The distance between the auxiliary wheel and the rear wheel is designed so that the auxiliary wheels and the rear wheel work together to allow pulling the vehicle up the stairs so that first, the vehicle's wheel moves over the step, then the auxiliary wheels.

Another advantage of the invention is that the upper frame pipe has a handle for lifting the vehicle that works together with the locking device—by lifting the vehicle from the handle and holding it up, the lock of the locking device can be opened with the thumb of the same hand. When the vehicle is lifted by the handle and the lock unlocked, the upright element connecting the front wheel fork and vehicle's handlebar starts towards the folded position due to gravity. When unfolding the folded vehicle, the upright element connecting the front wheel fork and the vehicle's handlebar moves towards the unfolded position due to gravity. This ensures the ergonomics of the folding and unfolding steps due to the combination of the handle, the lock, the upright element connecting the front wheel fork and the vehicle's handlebar, the hinge between the upper frame pipe and the upright element connecting the front wheel fork and the vehicle's handlebar, and hand position. To complete the operation of folding up or unfolding the vehicle, it is easy to push the fork with the other hand so that it locks in the required position—either to lock it in the folded position or to lock it in the unfolded position.

An important advantage is that lifting the entire vehicle is not needed; it is sufficient to keep the front part of the vehicle lifted up. It is also not necessary to keep the vehicle balanced because the balance is achieved through the auxiliary wheels that are resting on ground.

LIST OF FIGURES OR OTHER ILLUSTRATING MATERIAL

The preferred embodiment of the invention is described in detail below, with reference to the attached figures, where:

FIG. 6 depicts the upper end of the support pipe located between the saddle and the lower frame pipe of a vehicle of the invention;

An exemplary embodiment of the invention

Figure 1:
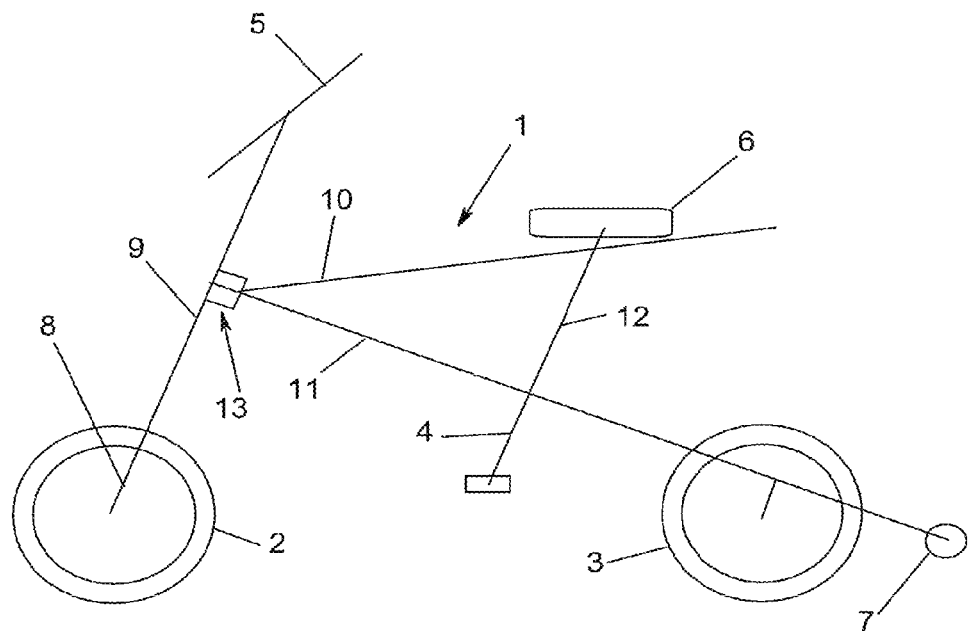
FIG. 1 depicts a schematic overview of one preferred version of the vehicle of the invention, with auxiliary wheels located at the end of the lower frame pipe.
Figure 2:
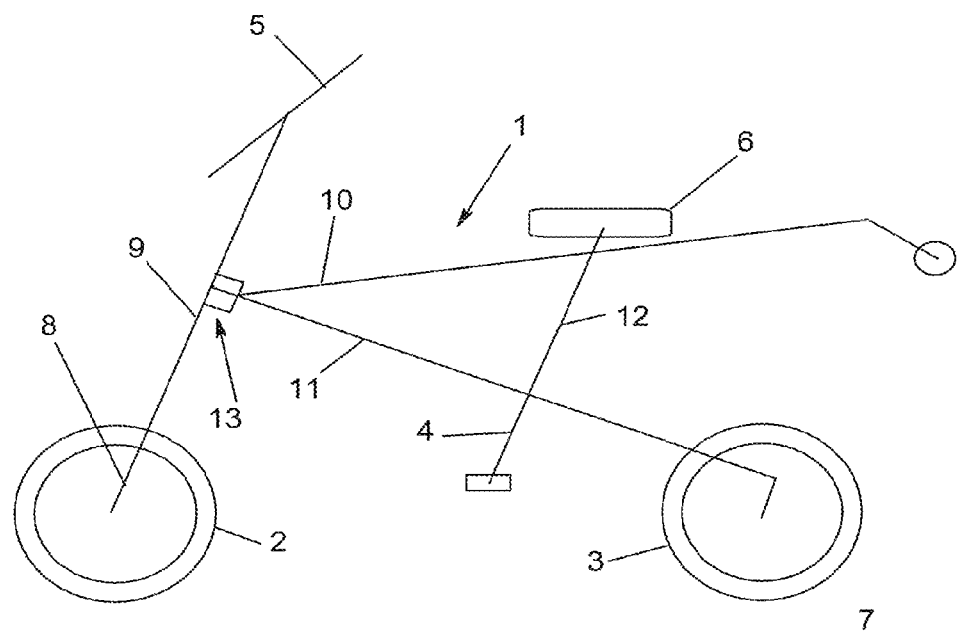
FIG. 2 depicts a schematic overview of another preferred version of a vehicle of the invention, with auxiliary wheels located at the end of upper frame pipe.
Figure 3:
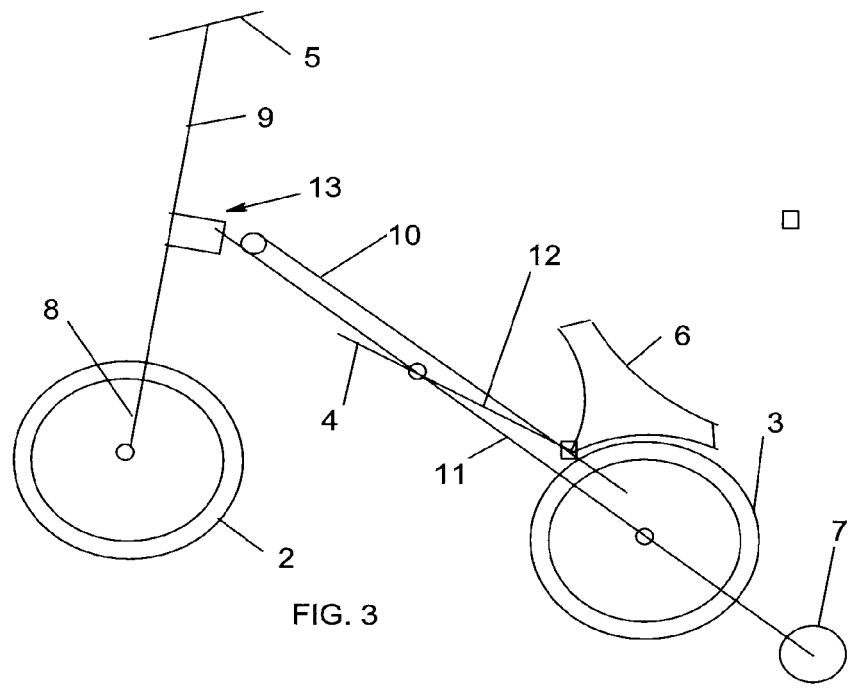
FIG. 3 depicts a vehicle of the invention after the first stage of folding up.
Figure 4A:
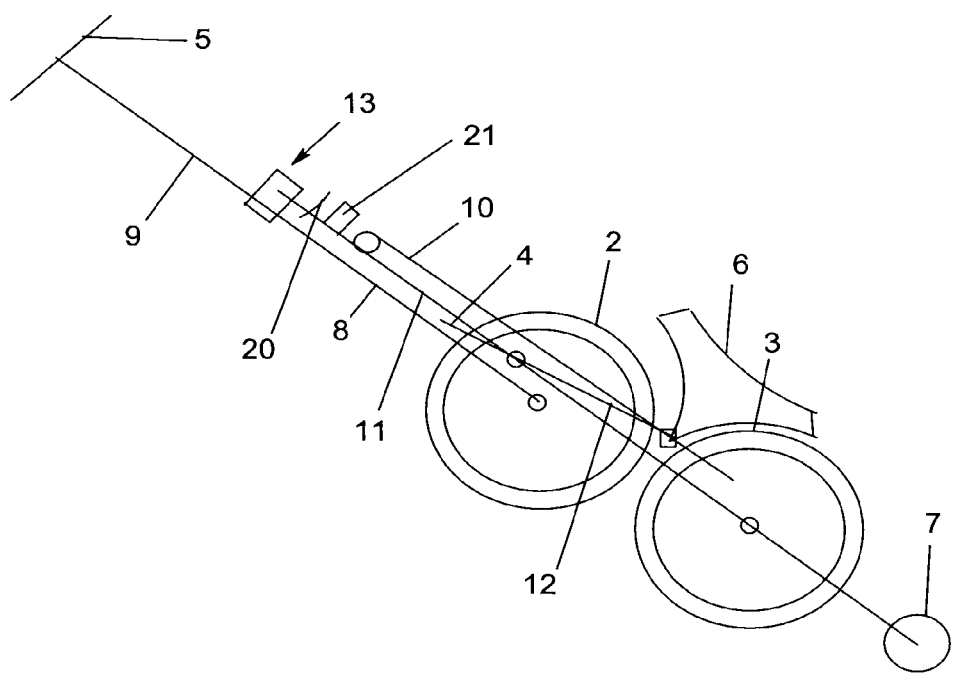
FIG. 4a depicts a vehicle of the invention with auxiliary wheels attached to the lower frame pipe after the second stage of folding up.
Figure 4B:
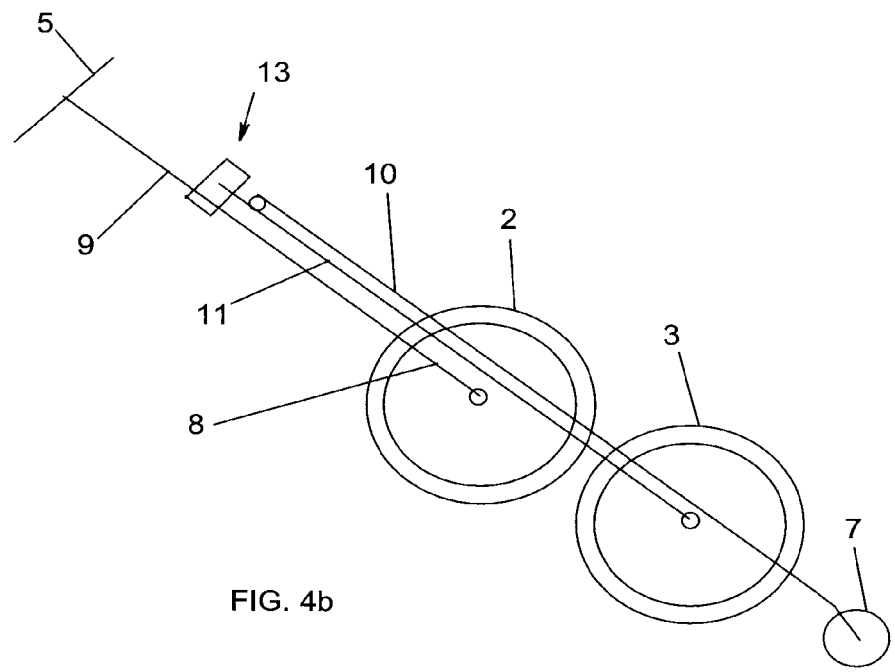
FIG. 4b depicts a vehicle of the invention with auxiliary wheels attached to the upper frame pipe after the second stage of folding up.
Figure 8:
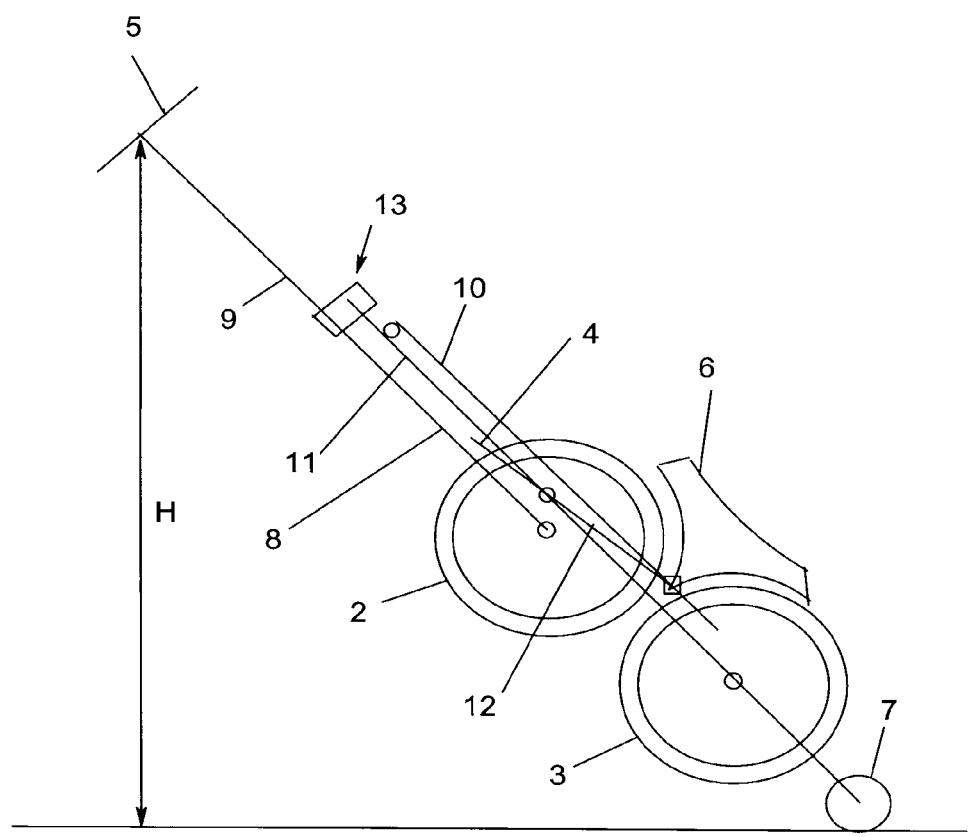
FIG. 8 depicts the movement of a vehicle of the invention on stairs.
Figure 5:
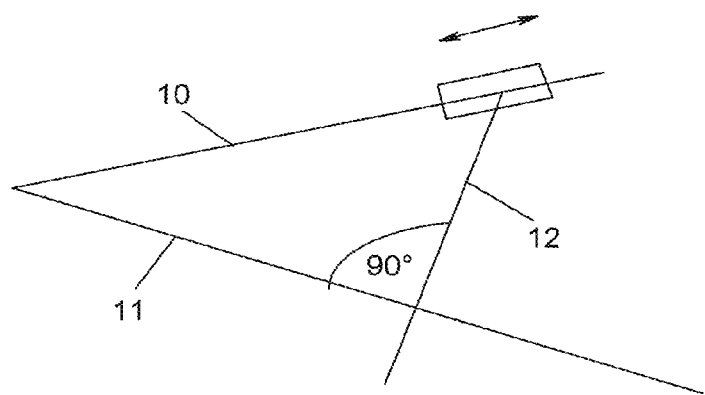
FIG. 5 depicts the triangle formed by the invented vehicle's frame.
Figure 7A:
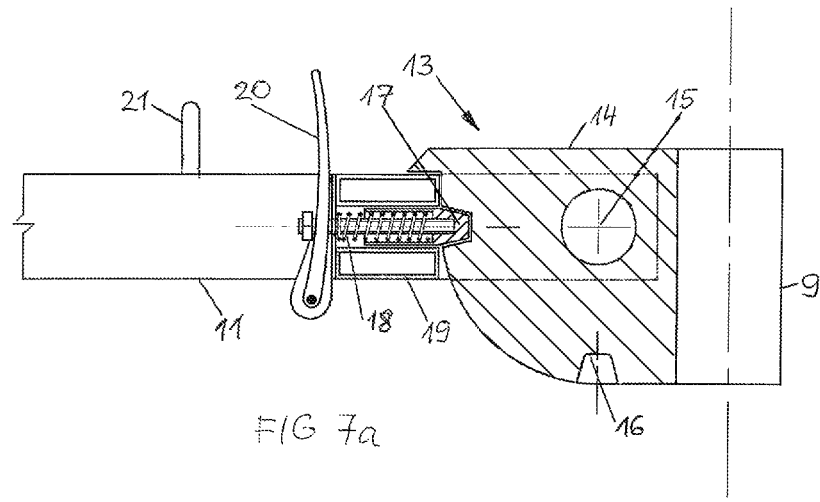
FIGS. 7 depicts the front wheel with a fork and the pivoting connection of the upright pipe of the handlebar of a vehicle of the invention.
Figure 7B:
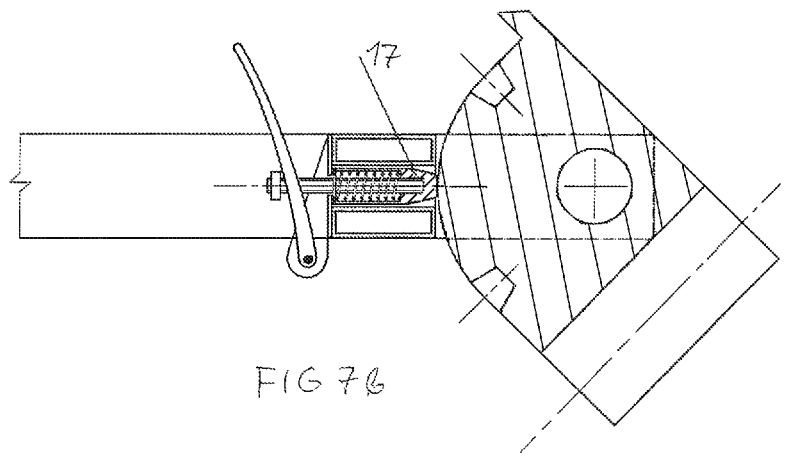
Figure 7C:
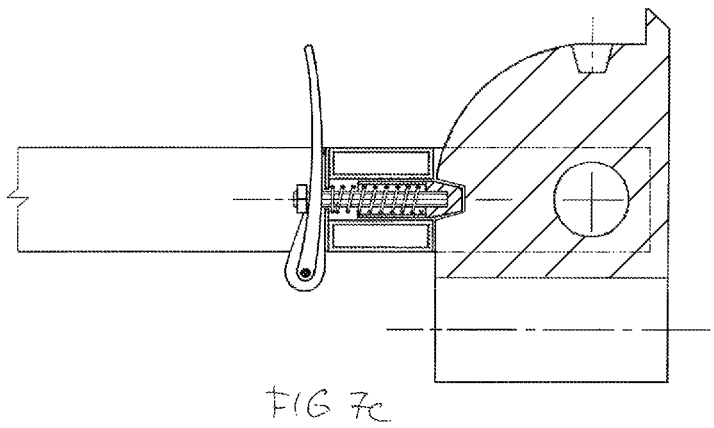

Referring to FIG. 1, a vehicle of the invention has a frame (1), front wheel (2), rear wheel (3), leg supports (4), handlebar (5), saddle (6), and auxiliary wheels (7). The handlebar (5) is connected to the front wheel fork (8) by an upright element (9). The frame comprises an upper frame pipe (10), a lower frame pipe (11), and a support element (12) between the saddle and the lower frame pipe. Auxiliary wheels (7) can be located at the distal end (FIG. 2) of the upper frame pipe (10) or at the distal end of the lower frame pipe (11). The first end of the upper frame pipe (10) is connected to the lower frame pipe (11) by a hinge. The upper frame pipe (10) extends distally from the saddle at certain length. There is a hinge assembly (13) between the first end of the lower frame pipe (11) and the upright element (9) (see FIGS. 7a to 7c). The hinge assembly comprises a connecting plate (14) with its edge connected to the upright element (9). The connecting plate is connected to the lower frame pipe (11) pivotally in relation to axis (15). The connecting plate has depressions (16) for receiving the locking bolt (17). The preferred embodiment has two depressions—one is for locking the vehicle in the riding position and the other is for locking the vehicle in the folded position. The bolt is pressed into the depression by a compression spring (18). The bolt can be actuated in its encasing (19) using the front trigger (20). In the normal position, the bolt (17) is pressed to the bottom of the depression (16) by the compression spring; using the front trigger (20), the compression spring is compressed and the bolt moves out of the depression, allowing the connecting plate (14) to pivot in relation to the lower frame pipe (11). After releasing the front trigger, the bolt is pressed back into the depression by the compression spring. The upper frame pipe has a handle (21) near the front trigger to facilitate moving the front trigger (see FIG. 3). Another purpose of the handle is to allow easy folding of the vehicle. To fold the vehicle, it is sufficient to grab the handle with one hand while simultaneously pushing the front trigger; when the vehicle is slightly lifted, the front part of the vehicle smoothly moves into the locked position. The lower end of the support element (12) between the saddle and the lower frame pipe is pivotally connected to the lower frame pipe, while the upper end of the support pipe has a sliding carriage (22) (see FIG. 6). The saddle (6) is connected to the upper frame pipe (10) by the seatpost (23). The sliding carriage has a sliding sleeve (24) that is moveably connected to the upper frame pipe. The sliding carriage has a surface (25) for receiving the locking device (26). The locking device is pressed into the locking position by a locking spring (27) that can be compressed using the rear trigger (28). The trigger can be manipulated through an opening (29) made into the saddle. The seatpost (23) also acts to limit the movement of the sliding carriage (22) along the upper frame pipe (10). In the preferred embodiment of the invention, the saddle (6) is connected to the upper frame pipe; in an alternative embodiment, the seatpost (23) can be connected to the sliding carriage (22). In that case, the upper frame pipe has a limiter (not shown in the drawings) for the locking sliding carriage and locking the vehicle into the riding position. The leg supports (4) are connected to an extension of the support element (12) extending downwards from the lower frame pipe. The lower frame pipe (11) and support element (12) cross each other at an angle α that in a preferred embodiment is 90°; in alternative embodiments, the said angle can vary between 80-100°. The location of the auxiliary wheel is designed to allow a regular size adult person tow the folded vehicle so that the distance (H) of the handlebar of the folded vehicle from the ground would preferably be ca. 600 mm (FIG. 8). The upper frame element or saddle has a supporting device (now shown in drawings) that functions as a third foothold (in addition to the two auxiliary wheels (7)) for helping to maintain the stability of the upright position of the folded vehicle.

The invention claimed is:

1. A folding vehicle comprising:
a frame,
a handlebar support portion for receiving a handlebar at the front end of the frame,
a front wheel support portion,
a rear wheel support portion at a distal end of the frame,
leg support portion for receiving leg supports in a middle part of the frame, and
a saddle support portion for receiving a saddle, wherein,
an upper part of the support element between the saddle support portion and a lower frame pipe has a sliding carriage that is moveable along an upper frame pipe and can be locked and unlocked to a frame pipe, the support element is pivotally connected to the lower frame pipe, a lower part of the support element has leg supports portion, and a connecting plate is located at the handlebar support portion side of the lower frame pipe that can be used to lock an upright element connecting the front wheel support portion and the vehicle's handlebar support portion into a riding and/or transporting position.

2. A folding vehicle of claim 1, wherein the angle between the support element and the lower frame pipe is between 80-100°.

3. A folding vehicle of claim 1, wherein the connecting plate is rigidly connected on one side to the upright element and at the middle part of the frame, the connecting plate is pivotally connected to the lower frame pipe.

4. A folding vehicle of claim 1, wherein the lower frame pipe has a locking bolt that allows rigidly locking the lower frame pipe and the connecting plate, whereas the connecting plate has depressions for receiving the locking bolt.

5. A folding vehicle of claim 4, wherein the locking bolt is pushed into a depression by a spring, one end of the locking bolt is connected to a front trigger to enable the actuation of the locking bolt.

6. A folding vehicle of claim 5, wherein one end of the front trigger is pivotally connected to the lower frame pipe, the front trigger has a depression for receiving the locking bolt, whereas the distance between a lower end of the front trigger and the depression is less than the distance between the depression and free end of the front trigger.

7. A folding vehicle of claim 5, wherein the lower frame pipe has a handle close to the front trigger that is adapted to work with the front trigger for actuating the locking bolt.

8. A folding vehicle of claim 1, wherein the sliding carriage is moveably connected to the upper frame pipe by a sliding sleeve.

9. A folding vehicle of claim 1, wherein the sliding carriage has a locking surface for receiving a locking device equipped with a rear trigger.

10. A folding vehicle of claim 9, wherein the saddle has an opening for manipulating the rear trigger.

11. A folding vehicle of claim 1, wherein a distal end of the lower frame pipe is equipped with auxiliary transportation wheels.

12. A folding vehicle of claim 1, wherein auxiliary transportation wheels are attached to the lower frame pipe.

13. A folding vehicle of claim 1, wherein the upper frame pipe, lower frame pipe and support pipe each consist of two parallel elements.

14. A folding vehicle of claim 1, wherein the saddle support portion is connected to a seatpost.

\* \* \* \* \*